(12) United States Patent
King et al.

(10) Patent No.: US 7,627,124 B2
(45) Date of Patent: Dec. 1, 2009

(54) WIRELESS COMMUNICATION AUTHENTICATION PROCESS AND SYSTEM

(75) Inventors: Chao King, Fremont, CA (US); John R. Christ, Santa Clara, CA (US)

(73) Assignee: Konica Minolta Technology U.S.A., Inc., Fremont, CA (US)

( * ) Notice: Subject to any disclaimer, the term of this patent is extended or adjusted under 35 U.S.C. 154(b) by 646 days.

(21) Appl. No.: 11/231,771

(22) Filed: Sep. 22, 2005

(65) Prior Publication Data

US 2007/0064947 A1 Mar. 22, 2007

(51) Int. Cl.
H04K 1/00 (2006.01)
G09C 5/00 (2006.01)

(52) U.S. Cl. ...................................... 380/270
(58) Field of Classification Search ................. 380/270
See application file for complete search history.

(56) References Cited

U.S. PATENT DOCUMENTS

| | | | |
|---|---|---|---|
| 5,638,047 A | 6/1997 | Orloff et al. | |
| 6,400,275 B1 | 6/2002 | Albers | |
| 6,634,504 B2 | 10/2003 | Robinson et al. | |
| 6,691,227 B1 | 2/2004 | Neves et al. | |
| 6,782,260 B2 | 8/2004 | Nakakita et al. | |
| 6,785,823 B1 | 8/2004 | Abrol et al. | |
| 6,795,701 B1 | 9/2004 | Baker et al. | |
| 6,834,341 B1 | 12/2004 | Bahl et al. | |
| 6,839,434 B1 | 1/2005 | Mizihovsky | |
| 6,845,092 B2 | 1/2005 | Vassilovski et al. | |
| 6,851,050 B2 | 2/2005 | Singhal et al. | |
| 6,898,628 B2 | 5/2005 | Bade et al. | |
| 6,908,387 B2 | 6/2005 | Hedrick et al. | |
| 6,909,903 B2 | 6/2005 | Wang | |
| 2003/0120925 A1* | 6/2003 | Rose et al. ................. 713/176 |
| 2004/0003250 A1 | 1/2004 | Kindberg et al. | |
| 2004/0130626 A1 | 7/2004 | Ouchi et al. | |
| 2004/0132234 A1 | 7/2004 | Ko et al. | |
| 2004/0138358 A1 | 7/2004 | Koch et al. | |
| 2004/0138377 A1 | 7/2004 | Matsuoka et al. | |
| 2004/0215728 A1 | 10/2004 | Isaacs et al. | |
| 2005/0060390 A1 | 3/2005 | Vakil et al. | |
| 2005/0100165 A1 | 5/2005 | Rose et al. | |
| 2005/0113107 A1 | 5/2005 | Meunier | |
| 2005/0122209 A1 | 6/2005 | Black | |
| 2005/0125963 A1 | 6/2005 | Lux et al. | |
| 2005/0136964 A1 | 6/2005 | Le Saint et al. | |

(Continued)

OTHER PUBLICATIONS

S. M. Bellovin; M. Merritt. "Encrypted Key Exchange: Password-Based Protocols Secure Against Dictionary Attacks". Proceedings of the I.E.E.E. Symposium on Research in Security and Privacy, Oakland. May 1992. Available at http://citeseer.ist.psu.edu/bellovin92encrypted.html. Downloaded Nov. 19, 2008.*

(Continued)

Primary Examiner—Nasser G Moazzami
Assistant Examiner—Travis Pogmore
(74) Attorney, Agent, or Firm—Finnegan, Henderson, Farabow, Garrett & Dunner, LLP

(57) ABSTRACT

The present application relates to an authentication process and system for a wireless communication system between a host device and a client device. This authentication process and system can make the confirmation of the authentication easier and clearer.

7 Claims, 5 Drawing Sheets

U.S. PATENT DOCUMENTS

2005/0138355 A1   6/2005   Chen et al.

OTHER PUBLICATIONS

IEEE. "IEEE Std 802.11i™-2004, IEEE Standard for Information Technology—Telecommunications and Information Exchange Between Systems—Local and Metropolitan Area Networks—Specific Requirements—Part 11: . . . —Amendment 6: . . . " Jul. 23, 2004. Available at http://standards.ieee.org/getieee802/download/802.11i-2004.pdf. Downloaded Nov. 19, 2008.*

S. M. Bellovin; M. Merritt. "Augmented Encrypted Key Exchange: A Password-Based Protocol Secure Against Dictionary Attacks and Password File Compromise". Proceedings of the 1st ACM Conference on Computer and Communications Security, ACM Press. Nov. 1993. Available at citeseer.ist.psu.edu/bellovin93augmented.html. Downloaded Nov. 19, 2008.*

* cited by examiner

WIRELESS COMMUNICATION AUTHENTICATION PROCESS AND SYSTEM

FIELD

The present invention relates to a wireless communication system and method.

INTRODUCTION

With the advent and proliferation of a wireless communication, people can transmit several data wirelessly between two devices quickly and easily. However, such wireless communication draws certain drawback. For instance, in the wireless communication system, the data can be more likely to be intercepted by the other person and it can cause security problem.

Therefore, it is desirable to conduct an authentication process before interchanging wirelessly data between two devices. Further, it is desirable to apply the system for the authentication process in low-cost. In addition, it is desirable to make easier the confirmation of the authentication process even if there is no display unit in the host device and/or the client device or the user cannot see the host device and/or the client device.

SUMMARY

According to various embodiments, the present teachings can provide a method for an authentication to begin a wireless communication between a host device and a client device. The method can comprise the following step. 1) A step for sharing at least one of a host public key and a client public key between the host device and the client device. (The host public key can be unique to the host device and the client public key can be unique to the client device.) 2) A step for calculating a host connection key which is attributed to at least one of the host public key and the client public key. 3) A step for calculating a client connection key which is attributed to at least one of the host public key and the client public key. 4) A step for producing and outputting a first tone based on the host connection key. 5) A step for producing and outputting a second tone based on the client connection key, If the authorization of the wireless communication between the host device and the client device are performed appropriately, the first tone can be same as the second tone. After the authorization of the wireless communication between the host device and the client device are performed appropriately, the host device and the client device are ready to transmit data with each other.

DESCRIPTION OF CERTAIN EMBODIMENTS

A System

Figure 1:
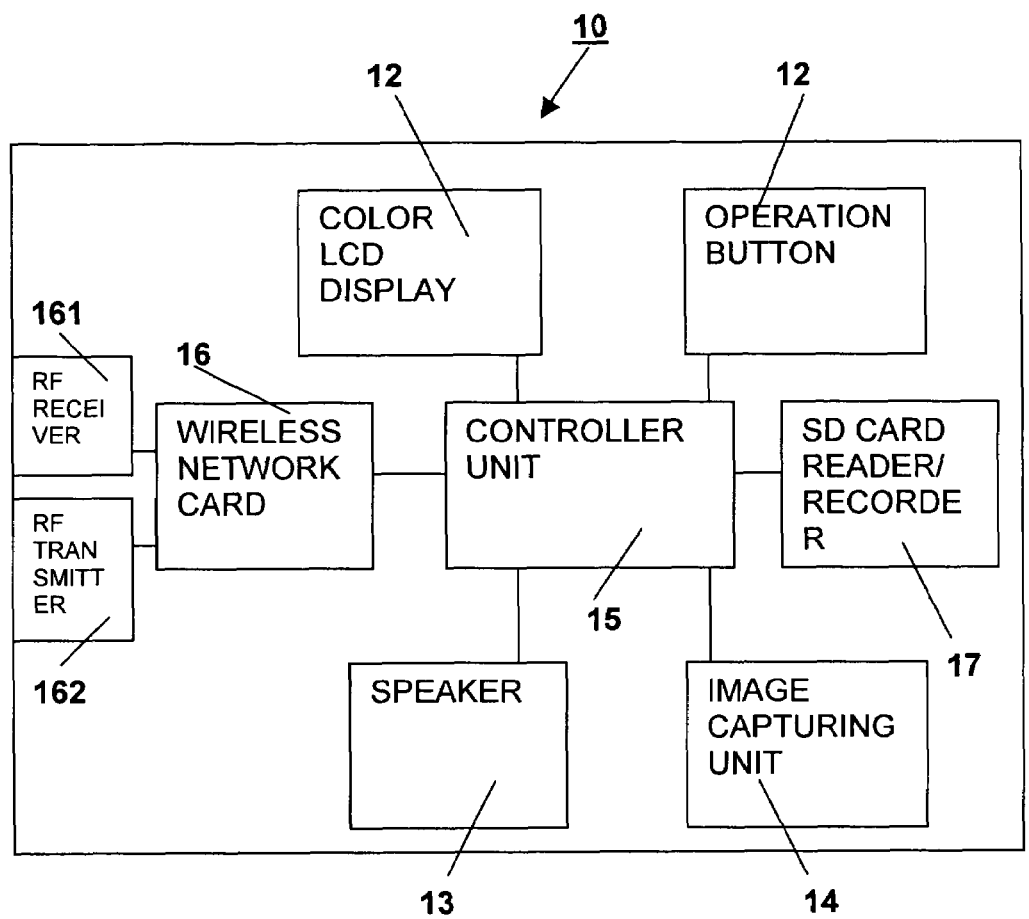
FIG. 1 illustrates a block diagram of a client device, according to certain embodiments.

A wireless communication system can comprise a host device and a client device. The wireless communication system can interchange data between the host device and the client device. Before interchanging the data, the wireless communication system can conduct authentication process so that the user can confirm that any other devices do not intercept the wireless communication between the host device and the client device.

The host device can produce a host connection key and the client device can produce a client connection key so that user can confirm whether the authentication process is conducted appropriately or not. The host device can produce a first note representing the host connection key and the client device can produce a second note representing the client connection key. If the authorization process of the wireless communication between the host device and the client device are performed appropriately, the first tone can be same as the second tone. So, if the user hears the same tones from the host device and the client device, the user can learn that the authentication process is conducted appropriately. After authorization process of the wireless communication between the host device and the client device are performed appropriately, the host device and the client device can be ready to interchange and/or transmit the data with each other.

Examples of the host device consistent with certain embodiments of the invention include, but are not limited to, a personal computer (PC), a server and a printer. Examples of the client device consistent with certain embodiments of the invention include, but are not limited to, a personal computer (PC), a laptop computer, a cell phone, a portable hard disk and a digital camera.

In certain embodiments, the same algorithm for the authentication process can be stored in the client device and the host device. In certain embodiments, the algorithm can be recorded in a computer readable medium. Examples of the computer readable medium consistent with certain embodiments of the invention include, but are not limited to, a digital memory card, a compact disk (e.g., CD-R, CD-RW, etc.), and a digital versatile disk (e.g., DVD-R, DVD-RW, DVD+RW, etc.). Various types of digital memory cards compatible with certain embodiments of the invention include, but are not limited to, a secure digital (SD) memory card, Compact Flash™, Smart Media™, Memory Stick™, and the like.

(a) a Host Device

The host device can comprise a storing unit, a processing unit, a transmit unit and a sound output unit. The host device can further comprise an input unit and/or a display unit.

In certain embodiments, the storing unit can store several software including the algorithm for authentication process. In certain embodiments, the storing unit can store several data including a private key, a host public key, an encoded key, a host connection key and the like.

In certain embodiments, the private key (e.g., 1234) can be several digits number. In certain embodiments, the private key (e.g., ASD43V) can include a letter. In certain embodiments, the private key can be stored in the storing unit of the host device before starting the authentication process. In certain embodiments, the authentication process between the host device and the client device both of which store same private key can be conducted appropriately. In certain embodiments, the private key can be unique to the combination of the client device and the host device. The private key can be utilized to produce the host connection key.

In certain embodiments, the host public key (e.g., 4563) can be several digits number. In certain embodiments, the host public key (e.g., VR22V) can include a letter. In certain embodiments, the host public key can be stored in the storing unit of the host device before starting the authentication process. In certain embodiments, the host public key can be unique to the host device. The host public key can be utilized to produce the encoded key and the host connection key.

In certain embodiments, the encoded key (e.g., 5555) can be several digits number. In certain embodiments, the encoded key (e.g., FVH345) can include a letter. In certain embodiments, the encoded key can be produced by the host device based on a client public key and/or a host public key during the authentication process. In certain embodiments, the encoded key can be unique to the combination of the client device and the host device. The encoded key can be utilized to produce the host connection key and a client connection key.

In certain embodiments, the host connection key (e.g., 3434) can be several digits number. In certain embodiments, the host connection key (e.g., GHOR403) can include a letter. In certain embodiments, the host connection key can be attributed to at least one of the host public key and a client public key. In certain embodiments, the host connection key can be produced by the host device based on the private key, the encoded key, the client public key and/or the host public key during the authentication process. In certain embodiments, the host connection key can be produced by the host device based on the private key and the encoded key. In certain embodiments, the host connection key can be unique to the combination of the client device and the host device. The host connection key can be utilized to produce a first note.

Example of the storing unit consistent with certain embodiments of the invention include, but are not limited to, a hard disk, a memory (e.g., a random access memory (RAM) including NVRAM, M RAM, P RAM, Fe RAM, Flash RAM, and a read only memory (ROM) and a removable data recording medium recorder/reader. Examples of a removable data recording medium for the removable data recording medium recorder/reader include, but are not limited to, a digital memory card, a compact disk (e.g., CD-R, CD-RW, etc.), and a digital versatile disk (e.g., DVD-R, DVD-RW, DVD+RW, etc.). Various types of digital memory cards compatible with certain embodiments of the invention include, but are not limited to, a secure digital (SD) memory card, Compact Flash™, Smart Media™, Memory Stick™, and the like.

In certain embodiments, the processing unit can control the entire system of the host device and/or the various units in the host device. The processing unit can run various software including the algorithm for the authentication process. The processing unit can process and/or calculate several data. Example of the processing unit consistent with certain embodiments of the invention include, but are not limited to, a central processing unit (CPU) or a micro processing unit (MPU) with a memory and the application software necessary for the processing, and an integrated circuit (IC), an application specific integrated circuit (ASIC), a field programmable gate array (FPGA) and a programmable logic device (PLD) with the memory and the application software, if necessary. Example of the memory consistent with certain embodiments of the invention include, but are not limited to, a RAM including NVRAM, M RAM, P RAM, Fe RAM, Flash RAM, and a ROM.

In certain embodiments, the processing unit can calculate the host connection key. In certain embodiments, the processing unit can calculate the host connection key based on the encoded key. In certain embodiments, the processing unit can calculate the host connection key based on the encoded key and the private key. In certain embodiments, the processing unit can calculate the encoded key based on the client public key. In certain embodiments, the processing unit can calculate the encoded key based on the client public key and the host public key. In certain embodiments, the processing unit can obtain the encoded key by encoding the client public key and/or the host public key. In certain embodiments, the processing unit can produce a first note based on the host connection key. In certain embodiments, the processing unit can produce the first note based on the host connection key according to a correspondence between key components (e.g., digits and/or letters included in the host connection key) and each note (e.g., do, re, mi, fa, so, la, si). In certain embodiments, the processing unit can produce the first note based on the host connection key according to an algorithm.

In certain embodiments, the first tone can attribute to the host connection key. In other words, the first tone can represent the host connection key. The first tone can comprise several notes. For instance, the first tone can be re-mi-so-si.

In certain embodiments, the algorithm for calculating the host connection key and/or the encoded key can be stored in the storing unit. In certain embodiments, the correspondence between the key components and each note and/or the algorithm for producing the first tone can be stored in the storing unit.

In certain embodiments, the transmit unit can wirelessly transmit various data (e.g., the host public key, the encoded key and the like) and various signal from the host device to the client device and can wirelessly receive various data (e.g., the client public key and the like) and various signal from the client device. In certain embodiments, the transmit unit can wirelessly transmit and receive various data to share at least one of the encoded key, the host public key and the client public key with the client device. Examples of the transmit unit consistent with certain embodiments of the invention include, but are not limited to, a wireless LAN adapter, a wireless network card, an RF (radio frequency) transmitter, an RF receiver, an infrared rays transmitter and/or an infrared rays receiver.

In certain embodiments, the sound output unit can output various sound including the first note. Examples of the sound output unit consistent with certain embodiments of the invention include, but are not limited to, a speaker.

In certain embodiments, the user can input various data (e.g., the host public key and/or the private key and the like), information, response or instruction (e.g., start to interchange data after authentication process finishing appropriately) to the host device through the input unit. Examples of the input unit consistent with certain embodiments of the invention include, but are not limited to, a keyboard, a mouse, a push button, a touch panel, an operation panel and a removable data recording medium reader.

In certain embodiments, the display unit can display various images and texts including the host connection key and the like. Examples of the display unit consistent with certain embodiments of the invention include, but are not limited to, a liquid crystal display (LCD), a Braun tube, a cathode ray tube (CRT) and a plasma display panel.

(b) a Client Device

The client device can comprise a storing unit, a processing unit, a transmit unit and a sound output unit. The client device can further comprise an input unit and/or a display unit.

In certain embodiments, the storing unit can store several software including the algorithm for authentication process. In certain embodiments, the storing unit can store several data including the private key, the client public key, the encoded key, a client connection key and the like.

In certain embodiments, the private key can be same as the private key stored in the host device. In certain embodiments, the private key can be stored in the storing unit of the client device before starting the authentication process.

In certain embodiments, the client public key (e.g., 6375) can be several digits number. In certain embodiments, the client public key (e.g., OFNR45G) can include a letter. In certain embodiments, the client public key can be stored in the storing unit of the client device before starting the authentication process. In certain embodiments, the client public key can be unique to the client device. The client public key can be utilized to produce the encoded key and the client connection key.

In certain embodiments, the client connection key (e.g., 5656) can be several digits number. In certain embodiments, the client connection key (e.g., RAFIO56G) can include a letter. In certain embodiments, the client connection key can be attributed to at least one of the host public key and a client public key. In certain embodiments, the client connection key can be produced by the client device based on the private key, the encoded key, the client public key and/or the host public key during the authentication process. In certain embodiments, the client connection key can be produced by the client device based on the private key and the encoded key. In certain embodiments, the client connection key can be unique to the combination of the client device and the host device. The client connection key can be utilized to produce a second note. If the authentication process for wireless communication between the host device and the client device is conducted appropriately, the client connection key can become same as the host connection key.

Example of the storing unit consistent with certain embodiments of the invention include, but are not limited to, a hard disk, a memory (e.g., a RAM including NVRAM, M RAM, P RAM, Fe RAM, Flash RAM, and a ROM and a removable data recording medium recorder/reader.

In certain embodiments, the processing unit can control the entire system of the client device and/or the various units in the client device. The processing unit can run various software including the algorithm for the authentication process. The processing unit can process and/or calculate several data. Example of the processing unit consistent with certain embodiments of the invention include, but are not limited to, a CPU or a MPU with the memory and the application software necessary for the processing, and an IC, an ASIC, a FPGA and a PLD.

In certain embodiments, the processing unit can calculate the client connection key. In certain embodiments, the processing unit can calculate the client connection key based on the encoded key. In certain embodiments, the processing unit can calculate the client connection key based on the encoded key and the private key. In certain embodiments, the processing unit can produce a second note based on the client connection key. In certain embodiments, the processing unit can produce the second note based on the client connection key according to a correspondence between key components (e.g., digits and/or letters included in the client connection key) and each note (e.g., do, re, mi, fa, so, la, si). In certain embodiments, the processing unit can produce the second note based on the client connection key according to an algorithm.

In certain embodiments, the second tone can attribute to the client connection key. In other words, the second tone can represent the client connection key. The second tone can comprise several notes. For instance, the second tone can be fa-si-so-si. If the second tone becomes same as the first tone, that can mean that the authentication process is conducted appropriately.

In certain embodiments, the algorithm for calculating the client connection key and/or the encoded key can be stored in the storing unit. The algorithm can be same as the algorithm stored in the host device. In certain embodiments, the correspondence between the key components and each note and/or the algorithm for producing the second tone can be stored in the storing unit.

In certain embodiments, the transmit unit can wirelessly transmit various data (e.g., the client public key and the like) and various signal from the client device to the host device and can wirelessly receive various data (e.g., the encoded key and the like) and various signal from the host device. In certain embodiments, the transmit unit can wirelessly transmit and receive various data to share at least one of the encoded key, the host public key and the client public key with the host device. Examples of the transmit unit consistent with certain embodiments of the invention include, but are not limited to, a wireless LAN adapter, a wireless network card, an RF transmitter, an RF receiver, an infrared rays transmitter and/or an infrared rays receiver.

In certain embodiments, the sound output unit can output various sound including the second note. Examples of the sound output unit consistent with certain embodiments of the invention include, but are not limited to, a speaker.

In certain embodiments, the user can input various data (e.g., the client public key and/or the private key and the like), information, response or instruction (e.g., the instruction to start to interchange the data between the host device and the client device) to the client device through the input unit. Examples of the input unit consistent with certain embodiments of the invention include, but are not limited to, a keyboard, a mouse, a push button, a touch panel, an operation panel and a removable data recording medium reader.

In certain embodiments, the display unit can display various images and texts including the client connection key and the like. Examples of the display unit consistent with certain embodiments of the invention include, but are not limited to, a LCD, a Braun tube, a CRT and a plasma display panel.

AN EXAMPLE

One example of the method and the system for authentication process of the wireless communication is described in the following. This invention is not limited to the following example.

Figure 2:
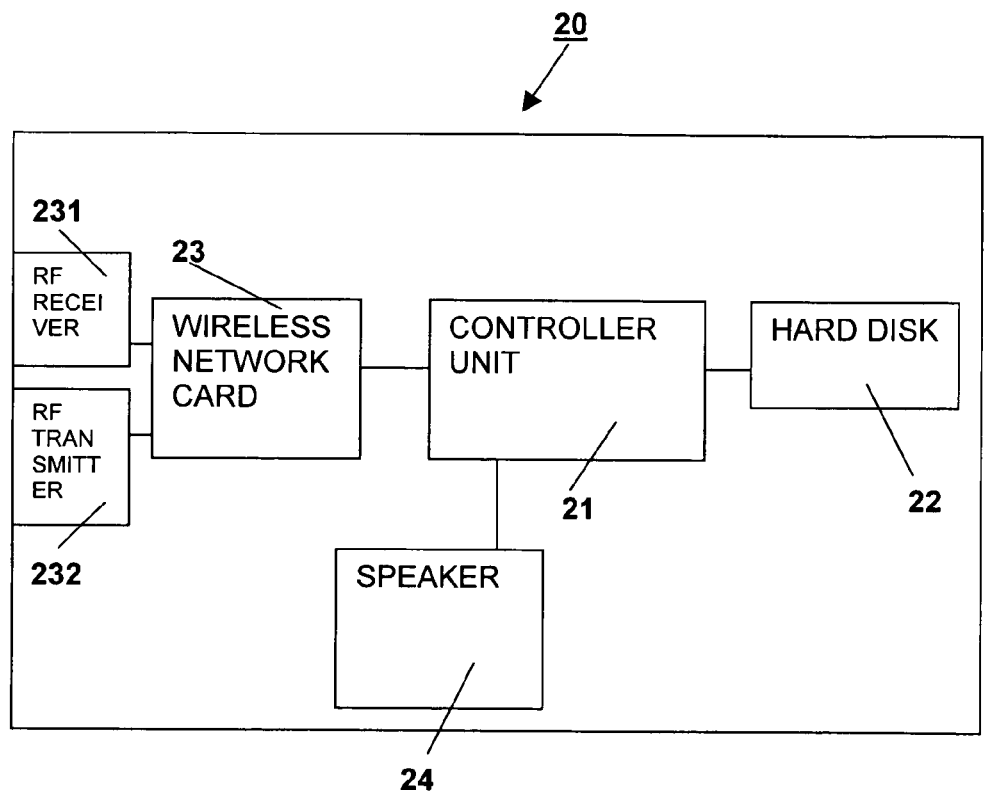
FIG. 2 illustrates a block diagram of a client device, according to certain embodiments.

In this embodiment, as illustrated in FIG. 2, the host device can be a server 20 and the client device can be a digital camera 10. Both of the server 20 and the digital camera 10 can communicate with each other wirelessly utilizing RF (radio frequency).

Figure 3:
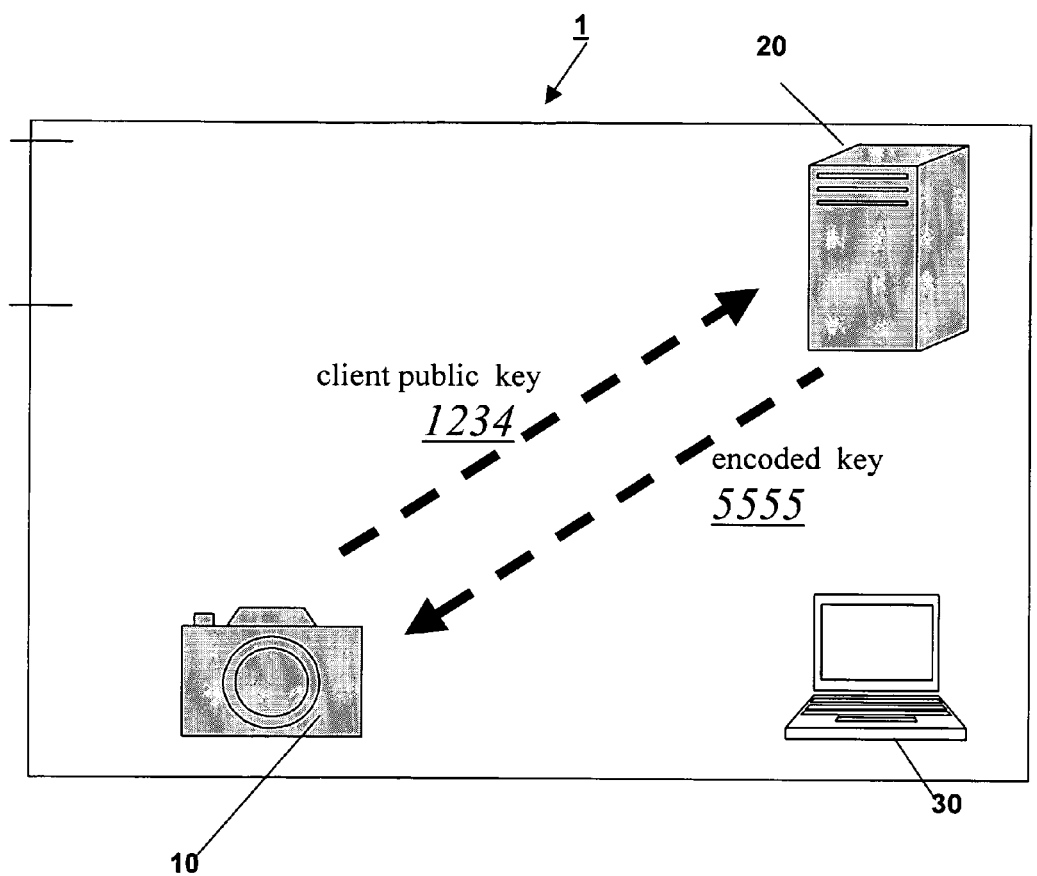
FIG. 3 illustrates a block diagram showing a flow of keys between the client device and the host device, according to certain embodiments.

As illustrated in FIG. 1, the digital camera 10 can comprise the input unit (e.g., an operation button 11), the sound output unit (e.g., a speaker 13), the transmit unit (e.g., a wireless network card 16 with an RF receiver 161 and an RF transmitter 162), the processing unit (e.g., a controller unit 5 comprising a CPU, a ROM and a RAM), the storing unit (e.g., a SD card reader/recorder 17 and the ROM and the RAM included in the controller unit 5), a color LCD display 12 and the image capturing unit 14, As illustrated in FIG. 2, the server 20 can comprise the sound output unit (e.g., a speaker 24), the transmit unit (e.g., a wireless network card 23 with an RF receiver 231 and an RF transmitter 232), the processing unit (e.g., a controller unit 21 comprising a CPU, a ROM and a RAM) and the storing unit (e.g., a hard disk 22 and the ROM and the RAM included in the controller unit 5), In this example, as illustrated in FIG. 3, the server 10 as the host device is located in a room 1. Then, the user can bring his/her digital camera 10 as the client device into the room 1.

The hard disk 22 of the server 20 can store a private key (e.g., 2121) and a host public key (e.g., 4321). The RAM included in the controller unit 15 of the digital camera 10 can store a private key (e.g., 2121) and a client public key (e.g., 1234). The private key stored in the server is same as the private key stored in the digital camera. The host public key is unique to the server 20. The client public key is unique to the digital camera 10.

In this example, the private key and the public key are the 4 digits number. In certain embodiments, any digits number and/or letters can be used for the private key and the public key.

Figure 5:
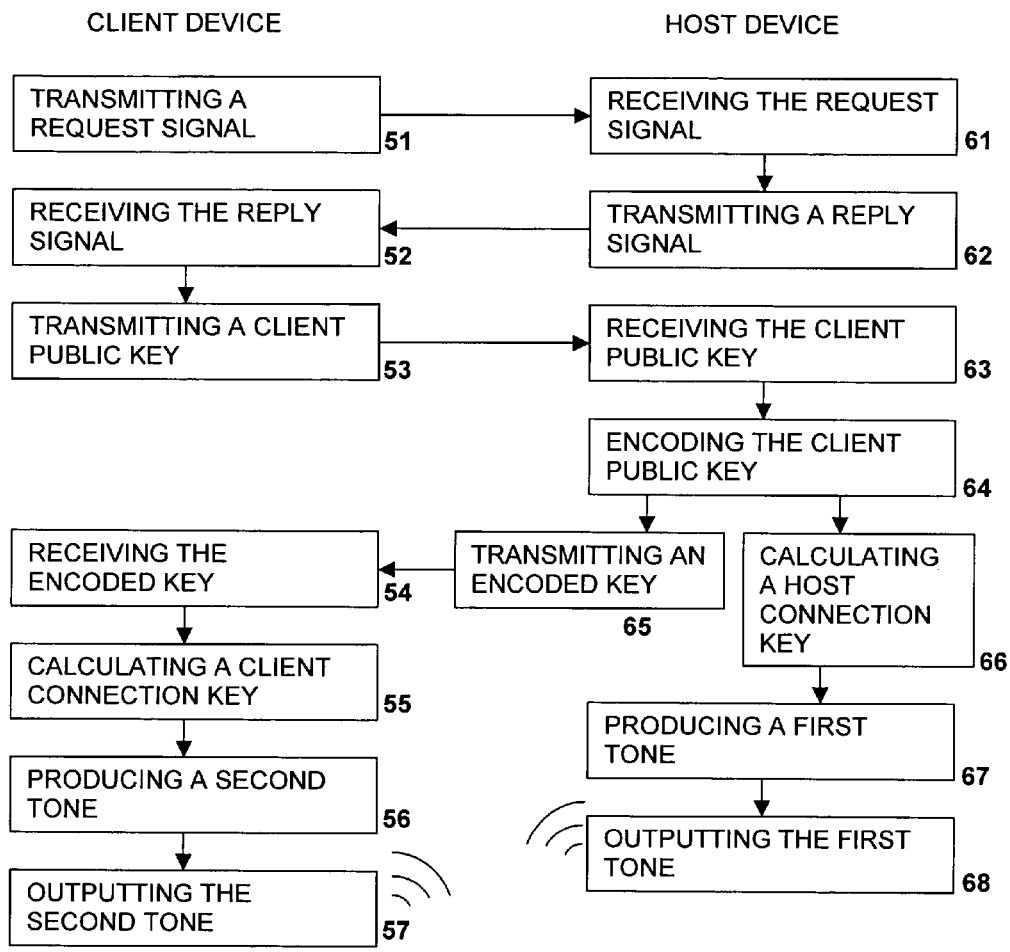
FIG. 5 illustrates a flow chart for an authentication process, according to another embodiments.

If the user wants to transmit the data (e.g., photo image data) stored in the digital camera 10 to the server 20, the user can instruct the digital camera 10 to transmit the data from the operation button 11. If the instruction to transmit the photo image data is input to the digital camera 10 from the operation button 11, the controller unit 15 of the digital camera 10 can produce a request signal to start an authentication process and the request signal can be transmitted wirelessly utilizing RF from the wireless network card 16 and the RF transmitter 162 to the whole of inside the room 1. (51 in FIG. 5)

The server 20 can receive the request signal by the RF receiver 231 and the wireless network card 23. (61 in FIG. 5) After receiving the request signal, the controller unit 21 of the server 20 can produce a reply signal and the reply signal can be transmitted from the RF transmitter 232 and the wireless network card 23 to the whole of inside the room 1. (62 in FIG. 5) If the digital camera 10 can receive the reply signal from the server 20 by the RF receiver 161 (52 in FIG. 5), the controller 15 of the digital camera 10 can transmit the client public key (1234) stored in the RAM from the RF transmitter 232 as illustrated in FIG. 3. (53 in FIG. 5) The host computer 20 can receive the client public key (1234) by the RF receiver 231 and the RAM in the controller unit 21 can store the client public key (1234). (63 in FIG. 5)

After receiving the client public key, the controller unit 21 can encode the client public key (1234) utilizing the host public key (4321) stored in the hard disk 22 according to the algorithm stored in the RAM of the controller unit 21 so that the server 20 can obtain an encoded key. (64 in FIG. 5) For instance, in this example, the encode can be conducted by adding the client public key (1234) to the host public key (4321). Therefore, the encoded key in this example can be 5555. In certain embodiments, more complicated algorithm or calculation utilizing the client public key and the host public key can be conducted to obtain the encoded key. The encoded key (5555) can be stored in the RAM in the controller unit 21.

After calculating the encoded key (5555), the server 20 can calculate a host connection key based on the encoded key according to the algorithm stored in the RAM of the controller unit 21. (66 in FIG. 5) The controller unit 21 can subtract the private key (2121) from the encoded key (5555) according to the algorithm so that the controller unit 21 can obtain the host connection key. In this example, the server 20 can obtain the host connection key which is 3434. The host connection key (3434) can be stored in the RAM of the controller unit 21. In certain embodiments, more complicated algorithm or calculation utilizing the encoded key and the private key can be conducted to obtain the host connection key.

Also, after calculating the encoded key (5555), the controller unit 21 of the server 20 can transmit the encoded key (5555) from the RF transmitter 232. (65 in FIG. 5) Then, the digital camera 10 can receive the encoded key (5555) by the RF receiver 161. (54 in FIG. 5) The encoded key can be stored in the RAM of the controller unit 15.

After receiving the encoded key (5555), the digital camera 10 can calculate a client connection key based on the encoded key according to the algorithm which is identical algorithm utilized by the server 20. (55 in FIG. 5) The controller unit 15 can subtract the private key (2121) stored in the digital camera from the encoded key (5555) transmitted from the server according to the algorithm so that the controller unit 15 can obtain the client connection key. In this example, the digital camera 10 can obtain the client connection key which is 3434. The client connection key (3434) can be stored in the RAM of the controller unit 15. In certain embodiments, more complicated algorithm or calculation utilizing the encoded key and the private key can be conducted to obtain the client connection key.

After calculating the host connection key, the server 20 can produce a first tone based on the host connection key (3434). (67 in FIG. 5) And, after calculating the client connection key, the digital camera 10 can produce a second tone based on the client connection key (3434). (56 in FIG. 5) In this example, each digit included in the host connection key and the client connection key can correspond to each note of sol-fa as shown in Table A. The RAM of the controller 21, 15 can store the correspondence between the note and the digit.

TABLE A

| | DIGIT | | | | | | | | | |
|---|---|---|---|---|---|---|---|---|---|---|
| | 0 | 1 | 2 | 3 | 4 | 5 | 6 | 7 | 8 | 9 |
| NOTE | do | Re | Mi | fa | so | La | Si | do($2^{nd}$) | re($2^{nd}$) | mi($2^{nd}$) |

The controller 21 of the server can produce the first tone based on the correspondence shown in Table A and the host connection key. Also, the controller 15 of the digital camera can produce the second tone based on the correspondence shown in Table A and the client connection key. In this example, the first tone corresponding to the host connection key (3434) can be fa-so-fa-so. Also, the second tone corresponding to the client connection key (3434) can be fa-so-fa-so.

After producing the first tone and the second tone, the speaker 13 of the digital camera 10 can output the second tone (57 in FIG. 5) and the speaker 24 of the server 20 can output the first tone. (68 in FIG. 5)

If the authentication process is conducted appropriately, the client connection key can be same as the host connection key. Therefore, the first tone also can become same as the second tone when the authentication process is conducted appropriately.

In this example, the user can hear same tones which are fa-so-fa-so from the speaker 13 of the digital camera and the speaker 24 of the server. If the user hears the same tones from both of the server 20 and the digital camera 10, the user can learn that the authentication process for the wireless communication between the digital camera 10 and the server 20 can be conducted correctly. After that, the user can instruct to start to transmit data wirelessly such as the photo image data between the server 20 and the digital camera 10 from the operation button 12. Then, the server 20 and the digital camera 10 can interchange several data and/or signal wirelessly utilizing RF.

Figure 4:
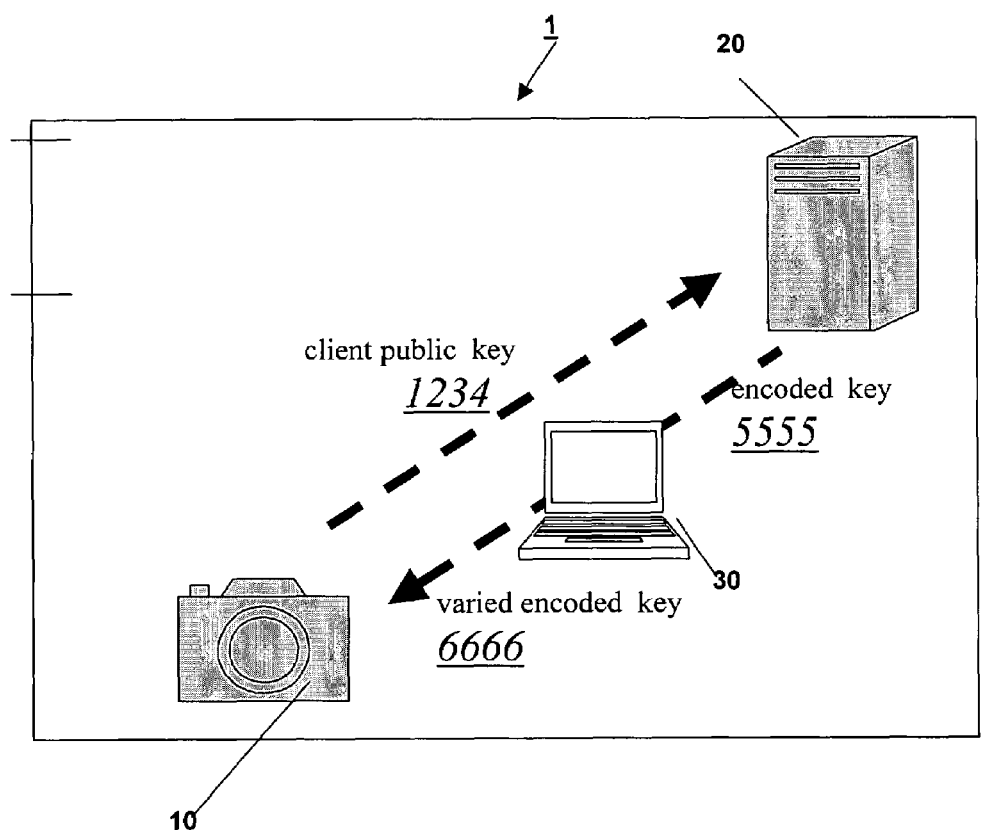
FIG. 4 illustrates a block diagram showing a flow of keys between the client device and the host device, according to another embodiments.

On the other hand, FIG. 4 illustrates an example in which the other device 30 intercepts the wireless communication between the digital camera 10 and the server 20.

If the other device 30 intercepts the encoded key (5555) transmitted from the server, the encoded key can vary to the other digit (e.g., 6666). Therefore, the digital camera 10 can receive 6666 as the encoded key.

After receiving the encoded key (6666), the digital camera 10 can calculate a client connection key based on the encoded key (6666) according to the algorithm which is identical algorithm utilized by the server 20. The controller unit 15 can subtract the private key (2121) from the encoded key (6666) so that the controller unit 15 can obtain the client connection key. In this example, the digital camera 10 can obtain the client connection key which is 4545. Therefore, the client connection key is different from the host connection key. The difference between the client connection key and the host connection key means that the authentication process cannot be conducted appropriately. The controller 21 can produce the second tone based on the client connection key (4545). In this example, the second tone is so-la-so-la Then, the first tone which is fa-so-fa-so can be output from the server 20. And, the second tone which is so-la-so-ka can be output from the digital camera 10.

In this example, the user can hear different tones which are so-la-so-la and fa-so-fa-so from the speaker 13 of the digital camera and the speaker 24 of the server. If the user hears the different tones from the server 20 and the digital camera 10, the user can learn that the authentication process for the wireless communication between the digital camera 10 and the server 20 cannot be conducted correctly. For instance, the user can learn some device may intercept the communication between the digital camera 10 and the server 20. After that, the user can instruct to stop to transmit data wirelessly such as the photo image data between the server 20 and the digital camera 10 from the operation button 12. Then, the server 20 and the digital camera 10 do not interchange several data and/or signal wirelessly utilizing RF.

Other various embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for an authentication to begin a wireless communication between a host device and a client device, the method comprising the steps of:
   - sharing at least one of a host public key and a client public key with the host device and the client device, the host public key being unique to the host device and the client public key being unique to the client device,
   - calculating a host connection key which is attributed to at least one of the host public key and the client public key,
   - calculating a client connection key which is attributed to at least one of the host public key and the client public key,
   - producing and outputting a first tone based on the host connection key,
   - producing and outputting a second tone based on the client connection key,
   - wherein if the authorization of the wireless communication between the host device and the client device are performed appropriately, the first tone is same as the second tone, and
   - wherein after the authorization of the wireless communication between the host device and the client device are performed appropriately, the host device and the client device are ready to transmit data with each other.

2. The method of claim 1,
   wherein the sharing step comprises the steps of;
       transmitting the client public key from the client device to the host device,
   wherein the host connection key calculating step comprises the steps of;
       calculating an encoded key based on the client public key transmitted from the client device, and
       calculating the host connection key based on the encoded key,
   wherein the encoded key calculated by the host device is transmitted from the host device to the client device,
   wherein the client connection key calculating step comprises the steps of;
       calculating the client connection key based on the encoded key transmitted from the host device.

3. The method of claim 2,
   wherein in the host connection key calculating step, the host connection key is calculated based on the encoded key and a private key, and
   wherein in the client connection key calculating step, the client connection key is calculated based on the encoded key and the private key.

4. The method of claim 3,
   wherein the client device stores the private key beforehand, and the host device stores the same private key beforehand.

5. The method of claim 2,
   wherein in the host connection key calculating step, the encoded key is calculated based on the client public key transmitted from the client device and the host public key stored in the host device.

6. A host device for communicating with a client device via wireless communication comprising:
   - a storing unit which stores a host public key and a private key,
   - a processing unit which calculates an encoded key based on the host public key and a client public key transmitted from the host device via the wireless communication, and calculates a host connection key based on the encoded key and the private key for an authentication of the wireless communication,
   - a transmitting unit which transmits the encoded key to the client device, and
   - a sound outputting unit which outputs a first tone corresponding to the host connection key,
   - wherein if the authorization of the wireless communication between the host device and the client device are performed appropriately, the first tone is same as a second tone outputted from the client device, the second tone corresponding to a client connection key calculated by the client device and
   - wherein after the authorization of the wireless communication between the host device and the client device are performed appropriately, the host device are ready to exchange data with the client device.

7. A client device for communicating with a host device via wireless communication comprising
   - a storing unit which stores a client public key and a private key,
   - a transmit unit which transmits the client public key to the host device, a processing unit which calculates a client connection key based on the private key and an encoded key which is calculated by the host device based on the client public key and transmitted from the host device for an authentication of the wireless communication, a sound outputting unit which outputs a second tone corresponding to the client connection key, wherein if the authorization of the wireless communication between the host device and the client device are performed appropriately, the second tone is same as a first tone outputted from the host device, the first tone corresponding to a host connection key calculated by the host device and wherein after the authorization of the wireless communication between the host device and the client device are performed appropriately, the client device are ready to exchange data with the host device.

* * * * *

UNITED STATES PATENT AND TRADEMARK OFFICE
CERTIFICATE OF CORRECTION

PATENT NO. : 7,627,124 B2
APPLICATION NO. : 11/231771
DATED : December 1, 2009
INVENTOR(S) : Chao King et al.

It is certified that error appears in the above-identified patent and that said Letters Patent is hereby corrected as shown below:

Claim 1, column 9, lines 65-66, "are performed" should read --is performed--.

Claim 1, column 9, line 66, "is same" should read --is the same--.

Claim 1, column 10, lines 2-3, "are performed" should read --is performed--.

Claim 2, column 10, line 6, "steps of;" should read --steps of:--.

Claim 2, column 10, line 10, "steps of;" should read --steps of:--.

Claim 2, column 10, line 18, "steps of;" should read --steps of:--.

Claim 6, column 10, lines 53-54, "are performed" should read --is performed--.

Claim 6, column 10, line 54, "is same" should read --is the same--.

Claim 6, column 10, lines 59-60, "are performed" should read --is performed--.

Claim 6, column 10, line 60, "are ready" should read --is ready--.

Claim 7, column 11, line 9-column 12, line 1, "are performed" should read --is performed--.

Claim 7, column 12, line 1, "is same" should read --is the same--.

Claim 7, column 12, lines 6-7, "are performed" should read --is performed--.

Claim 7, column 12, line 7, "are ready" should read --is ready--.

Signed and Sealed this
Eighth Day of January, 2013

David J. Kappos
*Director of the United States Patent and Trademark Office*